United States Patent
Dominguez Castro et al.

(10) Patent No.: US 12,181,610 B2
(45) Date of Patent: Dec. 31, 2024

(54) CMOS IMAGE SENSOR FOR DIRECT TIME OF FLIGHT MEASUREMENT

(71) Applicant: TELEDYNE INNOVACIONES MICROELECTRONICAS SLU, Seville (ES)

(72) Inventors: Rafael Dominguez Castro, Benacazon (ES); JoséÁngel Segovia De La Torre, Seville (ES); Ana Gonzalez Marquez, Seville (ES); Rafael Romay, Seville (ES); Amanda Jiménez Marrufo, Castilleja de Guzman (ES)

(73) Assignee: TELEDYNE INNOVACIONES MICROELECTRONICAS SLU, Seville (ES)

( * ) Notice: Subject to any disclaimer, the term of this patent is extended or adjusted under 35 U.S.C. 154(b) by 660 days.

(21) Appl. No.: 17/292,581

(22) PCT Filed: Nov. 22, 2019

(86) PCT No.: PCT/EP2019/082208
§ 371 (c)(1),
(2) Date: May 10, 2021

(87) PCT Pub. No.: WO2020/104644
PCT Pub. Date: May 28, 2020

(65) Prior Publication Data
US 2021/0396856 A1    Dec. 23, 2021

(30) Foreign Application Priority Data

Nov. 23, 2018 (EP) ..................... 18382849
Apr. 29, 2019 (EP) ..................... 19171544

(51) Int. Cl.
*G01S 7/4863* (2020.01)
*G01S 7/487* (2006.01)
(Continued)

(52) U.S. Cl.
CPC .......... *G01S 7/4863* (2013.01); *G01S 7/4876* (2013.01); *G01S 17/894* (2020.01); *H04N 25/65* (2023.01); *H04N 25/75* (2023.01); *H04N 25/77* (2023.01)

(58) Field of Classification Search
CPC .... G01S 7/4863; G01S 7/4876; G01S 17/894; H04N 25/65; H04N 25/75; H04N 25/77
(Continued)

(56) References Cited

U.S. PATENT DOCUMENTS 5,381,175 A    1/1995  Sudo et al.
8,179,296 B2 *  5/2012  Kelly .................. H03M 1/12
                                              341/161
(Continued)

FOREIGN PATENT DOCUMENTS

EP    3128342 A1    2/2017
JP    2012-21896 A   2/2012
(Continued)

OTHER PUBLICATIONS

Jainwal, Low-Frequency Noise Reduction Using In-Pixel Chopping to Enhance the Dynamic Range of a CMOS Image Sensor, Journal of Latex Class Files, vol. 13, No. 9, Jan. 2016 (Year: 2016).*

(Continued)

*Primary Examiner* — James E Springer
(74) *Attorney, Agent, or Firm* — K&L Gates LLP (57) ABSTRACT

A direct TOF optic sensor is based on CMOS pixels, wherein a pixel structure comprises a photodetector PhD, a non linear resistance R and a transfer MOS transistor in series, and delivers an output signal at a sensing node SN between the resistor and the transfer transistors. The photogenerated current is continuously drained into the nonlinear resistance and converted to a voltage signal by the RC circuit formed by the nonlinear resistance and a capacitance at the sense (Continued)

node SN. The voltage signal is continuously transmitted to a readout circuitry 300 having a fast analog to digital converter. The RC circuit within the pixel structure has a low pass filtering function and a high frequency integrating function, so that noise, in particular thermal noise due to the nonlinear resistance is mainly shifted in a low frequency range, separate from a high frequency range of the main signal component corresponding to a pulse light signal received at the photodetector. The main signal component is recovered by means of one of a band pass or high pass filter F implemented in the readout circuitry, that increases the signal to noise ratio in the high frequency range.

19 Claims, 6 Drawing Sheets

(51) Int. Cl.
| | |
|---|---|
| *G01S 17/894* | (2020.01) |
| *H04N 25/65* | (2023.01) |
| *H04N 25/75* | (2023.01) |
| *H04N 25/77* | (2023.01) |

(58) Field of Classification Search
USPC .......................................................... 348/135
See application file for complete search history.

(56) References Cited

U.S. PATENT DOCUMENTS

| | | | |
|---|---|---|---|
| 2005/0270590 A1* | 12/2005 | Izumi | H04N 1/0318 |
| | | | 358/506 |
| 2010/0194956 A1 | 8/2010 | Yuan et al. | |
| 2012/0261553 A1 | 10/2012 | Elkind et al. | |
| 2016/0344965 A1 | 11/2016 | Grauer et al. | |
| 2018/0067196 A1* | 3/2018 | Irish | G01S 7/487 |

FOREIGN PATENT DOCUMENTS

| | | |
|---|---|---|
| JP | 2017-36971 A | 2/2017 |
| JP | 2019-32206 A | 2/2019 |

OTHER PUBLICATIONS

International Search Report and Written Opinion of the International Searching Authority for PCT/EP2019/082208 mailed Jan. 30, 2020.

* cited by examiner

CMOS IMAGE SENSOR FOR DIRECT TIME OF FLIGHT MEASUREMENT

CROSS REFERENCE AND STATEMENT OF PRIORITY

This application is a U.S. National Stage Entry under 35 U.S.C. § 371 of International Patent Application No. PCT/EP2019/082208, entitled CMOS IMAGE SENSOR FOR DIRECT TIME OF FLIGHT MEASUREMENT, filed Nov. 22, 2019, which in turn claims priority to European Patent Application Ser. No. 18/382,849.0, filed Nov. 23, 2018, and European Patent Application Ser. No. 19/171,544.0, filed Apr. 29, 2019. The contents of each of the foregoing applications are incorporated herein by reference in their entireties and for all purposes.

FIELD OF THE INVENTION

The invention relates generally to optical sensors for time-of-flight (TOF) measurement, and concerns more particularly optical sensors based on CMOS imaging sensor, and direct time of flight measurement (D-TOF).

BACKGROUND

Time of flight optical sensors are used in 3D imaging and range-finding applications, for example for survey or automotive driving assistance applications, to provide a map of distances of any object/detail in a scene under observation. Each distance information is computed from a time measure by a pixel or a group of pixels in the optical sensor, which is the travel time $t_t$ of a pulse light emitted from a modulated light source close to the detector towards the scene, and backscattered by an object in the illuminated scene. The applicable equation is $d=(½C) \cdot t_t$, where C is the light speed, and the division factor by 2 is in account of the round trip travel of light. In one method, the time measure is computed indirectly, from phase differences. In this case, the light source is a RF modulated one and the imaging sensor is operated to measure a light amplitude captured in each of N integration periods (N phases) that are offset to one another in a capturing sequence and the travel time is derived from the N levels using well known equations. In another method, the travel time is measured directly through detection of rising edges of pulse signals in a reconstructed waveform. There, the light source is one that emits light pulses and the image sensor is operated to trigger rising edges of backscattered short light pulse signals.

In any case, the optical sensor must have a high dynamic range and good signal to noise ratio (SNR), to be able to detect the nearest and farthest objects in the scene and/or darkest and brightest ones: this means that the pixel structure and operation should bring in the lowest noise level for enabling detection of the weakest signals over background light noise, and should not saturate for the strongest signals. The constraint may vary according to the intended application. But for instance, in automotive driving assistance applications, the optical sensor should be efficient when used by night, to capture any dark and bright details (same by daylight when the car enters a tunnel or a dark passage). Or even when a strong ambient light exists, like the sun light. CMOS image sensors are good candidates for such applications, with efficient pixels in terms of quantum efficiency, fill factor and high dynamic range. Also, the readout method with correlated double sampling (CDS) is efficient to cancel thermal noise (so called kTC noise) being brought by the electronic (reset transistor) in the capacitive sense node of the CMOS pixel. But in practice, CMOS image sensors in TOF systems implement only the indirect method, and their pixels are then operated in a very conventional timing sequence comprising a reset phase, an integration (N phases) sequence, and then a readout sequence.

Figure 1:
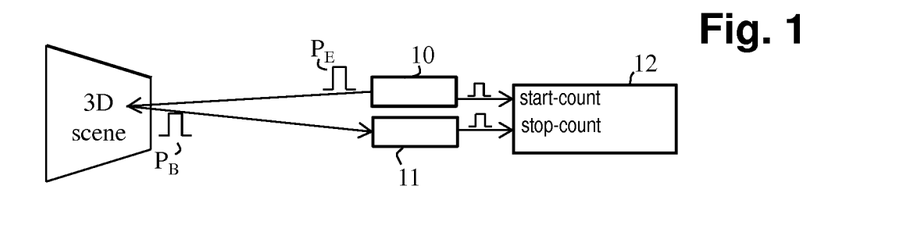
FIG. 1 illustrates a general principle of a D-TOF system.

However there is a growing interest in D-TOF systems implementing the direct measurement. The general principle of a D-TOF system is schematically illustrated on FIG. 1. It comprises a light pulse source 10 and an image sensor 11 close to one another, and a timer circuit 12 comprising at least one counter (processing system). A time count is initiated in the timer circuit by a start-count signal at the time of emission of a light pulse $LP_E$ by the light source 10 towards a 3D scene in a field of view; and the time count is stopped by a stop-count signal on detection by the image sensor 11 of a rising edge of a backscattered light pulse LP. Many time counts may be used, corresponding to objects at different distances and/or different regions of interest in the matrix of pixels of the sensor. This is well known state-of-the-art.

As known D-TOF systems we can cite SPADs systems (where "SPADs" means Single-Photon Avalanche Diodes). These systems are very efficient and accurate but needs a lot of power, because they rely on statistical analysis, histograms and averaging to find the rising edges in the sampled waveform, which implies a lot of light pulses. The efficiency is because of the great sensitivity of SPADs, to a single photon, and the insensitivity to readout noise. However their fill factor is quite small, because each pixel must include the photodetector (avalanche photodiode) together with a quenching circuit, a time to digital converter and an histogram module; and their quantum efficiency is also small (probability that one photon reaching the photodetector generates one electron), which combined with the fill factor gives a poor photodetection efficiency (PDE): only a limited number of photons among the overall incident photons can be detected in each pixel, let us say only one every twenty photons or even more.

There is then a need for high dynamic ranging D-TOF systems able to provide an accurate response with no use of statistical tools, based on the emission of only a few number of short light pulses, for instance in a range of one to five light pulses at most, and preferably based on only one or two pulses, minimizing both the need in light source power and circuit occupation area. All this is an incentive trend to look at designing D-TOF systems based on CMOS image sensors in which the pixel structure is comprised of a photodetector (a photodiode, preferably a pinned photodiode, or a photogate), a capacitive sensing node (floating diffusion) and a number of transistors (or gates of transistors) for the sequencing of the initialization, integration and readout phases of the pixel.

For D-TOF operation however, the CMOS pixels cannot be conventionally operated with a separate integration phase, then readout phase, but in a way that enables continuous reconstruction (readout) of the current waveform signal photogenerated by the sensitive element of the pixel.

A basic idea to achieve this is to sample the signal generated at the photosensitive node at very high frequency (Nyquist-Shannon theorem) with respect to the pulse duration so that the waveform of a single pulse of signal can be reconstructed (as an oscilloscope does), which allows to minimize the light power and have a very short reaction time. However the signal originated from the photodetector is a current flow, and it is very difficult to send out a very weak current flow to be converted to digital directly in current without be strongly degraded by the noise.

In more details, for D-TOF operation, the signal information to trigger in the continuous readout waveform is a rising edge corresponding to the time information to measure (time position of the backscattered light pulse). The rising edge physically corresponds to the photogeneration of a few electrons over the short pulse duration of a backscattered light pulse incident on the pixel. This may correspond in practice to a very weak signal amounting to a few electrons only, 10 to 20 electrons for example, which means that the internal noise at the pixel level must be very low. There is another requirement which is to be able to detect successive backscattered light pulses that can be close in time. Let's take a practical numerical example to better understand the underlying problem: with the light pulses having a 5 nanoseconds pulse duration, the receiver should be able to distinguish among two close backscattered light pulses corresponding to different details in the scene that are separated by only some tens of nanoseconds, for instance 20 nanoseconds. This means that at the sense node, which is capacitive, the memory effect of the rising edge must be short, to avoid mixing of pulses, which means loss of information.

It is then proposed to achieve this through integrating the photogenerated current produced by the photodetector in the capacitive sensing node of the pixel, and using a leakage resistor to discharge the capacitor and make it ready to integrate a next pulse. However the RC circuit acts as a high frequency integrator which modifies the shape of a pulse signal. Further, a high resistor value may be desirable to increase the gain of the I/V conversion for weak signals, but then for strong signals (that would correspond to bright and close details in the illuminated scene) the sense node capacitance may saturate, which means loss of information. Another constraint is linked to the RC time constant, which should not be too high so that after a step voltage at the sense node as a result of the high frequency integration by the RC circuit receiving an incoming pulse of current, the step can vanish fastly enough to enable detection of a new incoming pulse of current.

Another concern is the thermal noise (kTC noise) automatically brought by the resistor in the capacitive sense node of the CMOS pixel. If CDS readout is efficient for cancelling the thermal noise in the conventional chronological sequence, it is not a compatible technic with the proposed continuous signal reconstruction sequence, because of the high sampling rate which is needed. This thermal noise adds to the shot noise which directly depends on the signal level, which means the noise is not constant in time.

Then, operating a CMOS pixel for high dynamic range D-TOF measurement appears not straightforward at least in view of these different issues, in particular high dynamic range with practical constraints regarding saturation and SNR, and shape recovering, and noise and signal analysis at the level of the pixel appears necessary to understand respective influence of R and C over signal and noise. This analysis has in particular highlighted that a key point regarding SNR and influence of thermal noise, is that thermal noise power depends only of the capacitor value, not that of the resistance as assumed at first glance. Further, we found that the rms value of the thermal noise, when it is expressed in terms of a voltage value, is equal to the square root of the ratio of the product of the Boltzmann constant $k_B$ by the absolute temperature T to the capacitance value. Then it comes that the rms voltage is reduced with a high capacitance value.

However, we found that when seeking at distinguishing a weak signal of only a few electrons corresponding to a single short light pulse as explained above, over noise, we should better express the rms value not in terms of a voltage, but of a number of electrons. Then we found that to reduce the influence of thermal noise, the capacitance value should in fact be reduced as much as possible. Let us briefly explain this with reference to a simplified model in small signals of a CMOS imaging pixel implementing continuous I/V conversion of the photocurrent I(t) which is illustrated on FIG. 2. The RC circuit is in parallel on the current source I(t), which represents the photogenerated current. For the noise analysis, which depends on the signal, it was assumed that the current source emits a pulse of amplitude $I_0$ and of duration $\tau$, (where $\tau$ is the duration of the short light pulse of the D-TOF system of FIG. 1). The capacitor represents the integration capacitance at the sense node SN of the pixel. The resistor in parallel allows to make the signal information vanish in a certain time (RC time constant) and be ready to receive a new incoming current pulse.

For the purpose of evaluating the effect on SNR at the pixel level (shot noise, thermal noise) let us take a realistic example of a weak signal of $N_{e-}=16$ electrons produced from a light pulse of 5 nanoseconds (pulse duration). First, shot noise: an average (rms) value of the shot noise intrinsic to the signal then amounts to 4 electrons in application of EQ1: $\sigma_{shot_{Ne-}}=\sqrt{N_{e-}}$ and the signal to shot noise ratio, which is the ratio $$\left(\frac{Ne-}{\sqrt{N_{e-}}}\right),$$

amounts to 4 electrons, which is correct (it is generally admitted that the minimum SNR is 3 electrons).

Second, thermal noise: an average (rms) voltage value of the thermal noise induced by the resistor R is obtained from equation EQ2:

$$\sigma_{R_U}\sqrt{\overline{u^2}} = \sqrt{\frac{k_B \cdot T}{C}},$$

where $k_B$ is the Boltzmann constant, T the absolute temperature (300° K) and C the capacitance value.

Expressed in terms of electrons, it gives:

$$\sigma_{R_{Ne-}} = \frac{\sigma_{R_U} \cdot C}{q} = \frac{\sqrt{k_B \cdot T \cdot C}}{q} \quad (EQ3)$$

where q is the electric charge of one electron.

This shows as indicated above, that the thermal noise in terms of electrons increases with the capacitance value. Then to minimize thermal noise, we should consider a pixel structure and operation in which the capacitance at the sense node is reduced as much as possible.

But this also demonstrates that even with a low capacitance value, which typically means lower than a few units of femto farads ($10^{-15}$ farads) with now-a-days technology, the thermal noise remains too high, above ten electrons. For instance with a capacitance value as low as 2fF, the rms average value of the thermal noise amounts to 18 electrons (in application of EQ. 3). Then with a weak signal evaluated as above to 16 electrons, the SNR taking in account both shot noise and kTC noise falls to a value less than 1:

$$SNR = \frac{N_{e-}}{\sqrt{N_{e-} + \sigma^2_{R_{Ne-}}}} = \frac{16}{\sqrt{16 + 18^2}} = 0.87 \quad (EQ4)$$

This is far too small for successfully distinguishing a weak signal from noise. Note that in addition, there are further noise sources, not even discussed here, in particular background light noise, which depends on the application (light operational conditions and kind of sensed scene) and from the electronics coming after the pixel (amplifier, sampling, A/D conversion).

Then, even if we can find R and C values to optimize the different constraints regarding shape reconstruction, memory effect, I/V gain and SNR, this will not be enough to efficiently enable detection of such weak signals at the receiver based on continuous waveform reconstruction.

This low SNR together with the other constraints regarding pulse shape modification and saturation limits are technical problems to solve for achieving an efficient D-TOF CMOS pixel.

SUMMARY OF THE INVENTION

In the invention we find a technical solution to this problem, which combines use of a nonlinear resistor inside the pixel with filtering technics in the readout circuit. A nonlinear resistor provides the advantage that when the signal increases to a certain level, because of a strong light signal, a strong light background or a too long measurement phase, the resistance value is reduced which limits further excursion. That is, the nonlinear resistance avoids saturation in very high dynamic range, which is desirable. But the nonlinear resistance was found to produce an interesting advantage when considering the RC function with regards to the frequency domain.

Figure 3:
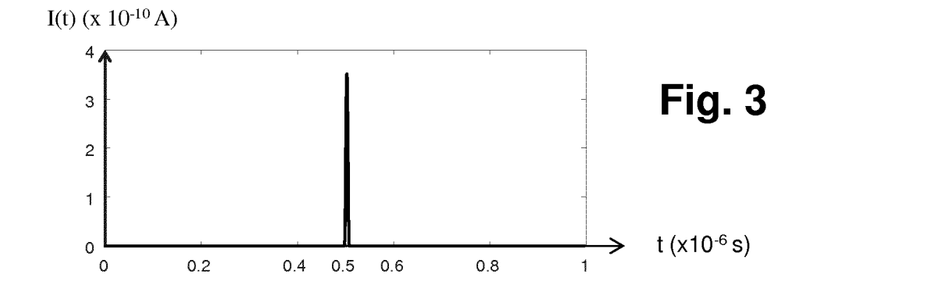
FIG. 3 represents an ideal pulse of current generated by the photodetector of a CMOS pixel in response to a short (backscattered) light pulse.
Figure 4:
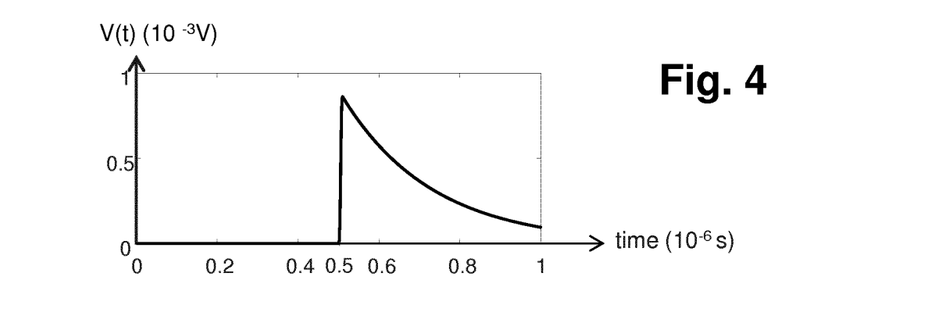
FIG. 4 illustrates the RC high frequency integration function over the capacitance of the sense node of the pulse of current of FIG. 3.

In more details, if we ignore the noise aspect, a backscattered light pulse reaching the pixel results in the generation at the photodetector node of a number of electrons over the light pulse duration σ, which is the current pulse illustrated by way of example on FIG. 3, and results through continuous sensing by a nonlinear resistance combining with the sense node capacitance as proposed, in a fast rising of the voltage waveform (steep edge) at the sense node as shown on FIG. 4.

Figure 2:
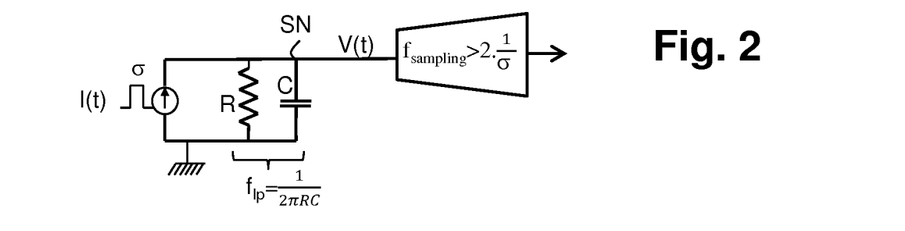
FIG. 2 is an equivalent circuit in small signal of a CMOS pixel integrating continuous I/V conversion through a resistor according to the invention.

This is because, the proposed sensing RC circuit does not function as a low pass filter over the full spectral range, but only in a low frequency range, and functions as an integrator over the capacitance node in a high frequency range which is that of the main information signal (corresponding to the pulse rising edge) that is of interest. We could demonstrate this through asymptotic analysis of the transfer function of the RC circuit of FIG. 2:

for $$f \ll \frac{1}{2 \cdot \pi \cdot R \cdot C},$$

corresponding to low frequencies, then the transfer equation is V=I·R;

for $$f \gg \frac{1}{2 \cdot \pi \cdot R \cdot C},$$

corresponding to high frequencies, then the transfer equation is $$V = \frac{I}{s \cdot C},$$

which represents an integrator of the intensity over the capacitor:

this is exactly the same behavior that would be obtained if no resistor was used at all.

This high frequency integration over the capacitance is what happens to the main signal component corresponding to the (short) light pulse duration σ. For instance, with σ=5 ns, the frequency signal is equal to 200 MHz: the useful signal information is then found above, for instance in a bandwidth of few tens of MHz above 200 MHz, and is not filtered by the RC circuit in account of the practical resistance and capacitance values. However the shape of the signal is strongly degraded because of the RC time constant as shown on FIG. 4.

Figure 5:
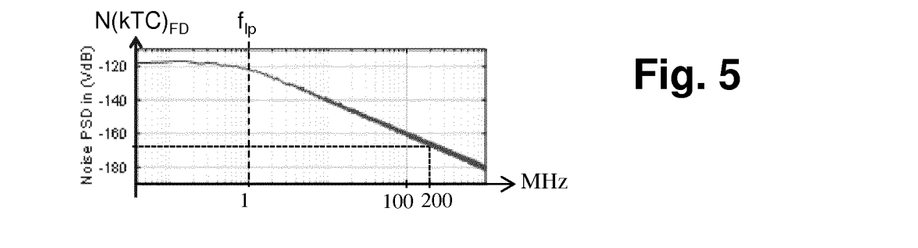
FIG. 5 represents the RC low pass filtering function applying to the thermal noise induced at the sense node capacitance by the resistor.

In contrast, as shown on FIG. 5, the thermal noise which is equivalent to white noise (flat spectral density), is concentrated in a low frequency band delimited by a cut-off frequency $f_{lp}$ of the low pass filter created by the RC circuit ($f_{lp}=1/(2\pi RC)$).

In practice an upper limit of the low frequency range concentrating most of the noise component corresponds to a cut-off frequency of the RC circuit; and a lower limit of the high frequency range concentrating most of the useful signal is a function of the pulse duration a, which results in practice in spaced apart (separated) low and high frequency bands.

Then, we ingeniously exploit this spectral separation resulting from the continuous current sensing through the proposed RC circuit inside the pixel, to increase the signal to noise ratio in the high frequency range of the useful signal through filtering, which also enables to recover the initial pulse shape. Then efficient detection of the pulse locations is obtained through triggering on the digitized samples (after filtering).

The invention is then about a CMOS pixel structure for achieving direct time of flight measurement and proposes implementing a continuous I/V conversion inside the pixel through a nonlinear resistor, and the technical solution takes advantage of a low pass filter operation and high frequency integration function of an RC circuit created by the nonlinear resistor combined with the sense node capacitance to recover most of the information of the signal with high signal to noise ratio through filtering in a band pass or high pass range at the level of the readout circuitry.

Other technical aspects improve the technical solution, through using transistors conventionally present in basic CMOS pixels to implement the I/V conversion in the measurement phase which is optimal in terms of conception and fabrication costs, and efficient in terms of SNR, high dynamic range, and simplicity of operation.

In particular a transfer transistor is usually provided in a CMOS pixel between the photodetector node and the sense node for transferring the photogenerated electrons accumulated in the photodetector to the sense node, so that the readout operation of the pixel can start. In the invention, such a transfer transistor between a photodiode and a sense node is provided in the pixel for use as a decoupling element between the photosensitive node and the sense node all along the measurement phase and the readout can be done while the transfer transistor is active. The capacitance at the sense node is then minimized, which helps to reduce the thermal noise as has been explained above.

As claimed, the invention concerns then a CMOS imaging sensor for detecting time occurrence of light pulses having a given pulse duration τ, comprising:
  pixels, having a pixel structure comprising at least:
    a photodetector operating as a current source,
    a transfer transistor connected in series between a sense node and the photodetector,
    a nonlinear resistor connected between a voltage supplying node of the pixel and the sense node, the sense node being a capacitive sense node,
  a control circuit for controlling a measurement phase in at least a selected pixel for measuring a time occurrence of a light pulse reaching the photodetector in the pixel, wherein in the selected pixel a voltage reference is applied to the voltage reference node, and the transfer transistor is the ON state all along the measurement phase, the transfer transistor then operating as a decoupling element between a photodetector node and the sense node, and the nonlinear resistor combining with a capacitance at the sense node form a RC circuit that has a low pass filtering function and high frequency integration function that produce a voltage signal that has a main signal component comprising at least a pulse location information in a high frequency range, and a noise component mainly concentrated in a low frequency range spaced apart from said high frequency range, and
  a readout circuitry of a voltage signal from the sense node of a selected pixel, which comprises at least:
    an analog to digital converter applying a high sampling time in respect of the pulse width duration, and
    filtering means configured to apply one of a band pass or high pass filter, before or after analog to digital conversion, having the effect of increasing the signal to noise ratio in at least a frequency band around the main signal components.

Implementing a non-linear resistor as a discrete resistor is in practice expensive in area occupation.

Advantageously, the nonlinear resistor is implemented through a transistor operated in a sub-threshold region. In an embodiment, this transistor is the reset transistor generally found in a conventional CMOS pixel. According to the invention, this reset transistor is operated in the sub-threshold region as a nonlinear resistor in selected pixel(s), and used as a switch and turned on to maintain the sense node at a voltage reference in non-selected pixels.

The invention also concerns a direct time of flight system comprising such an optical sensor as a receiver; and a method to operate a CMOS pixel for a measure of time through triggering a pulse location in a voltage signal waveform corresponding to a light pulse having reached the pixel.

Other characteristics and advantages of the invention will now be described, by way of non-limiting examples and embodiments, with reference to the accompanying drawings, in which:

DETAILED DESCRIPTION

Figure 6:
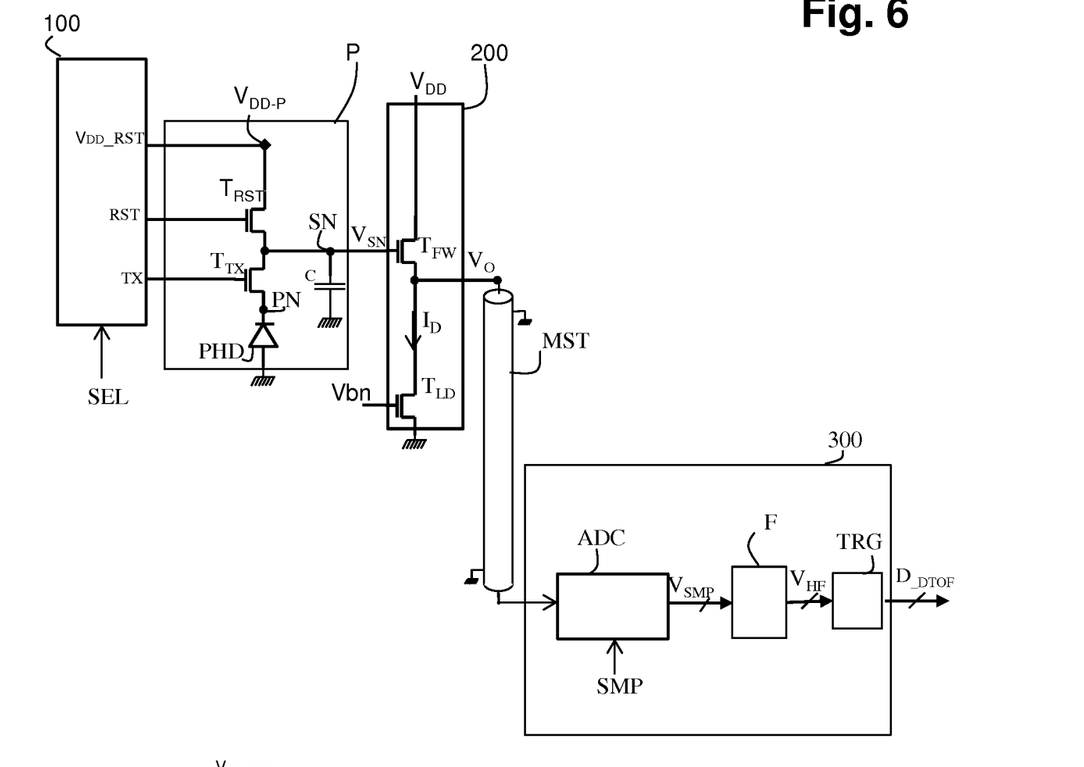
FIG. 6 is a schematic diagram of a basic pixel structure with associated circuits including an amplifier circuit between a sense node of the pixel and the input of a readout circuitry enabling a direct time of flight measurement in a CMOS image sensor according to the invention.
Figure 7:
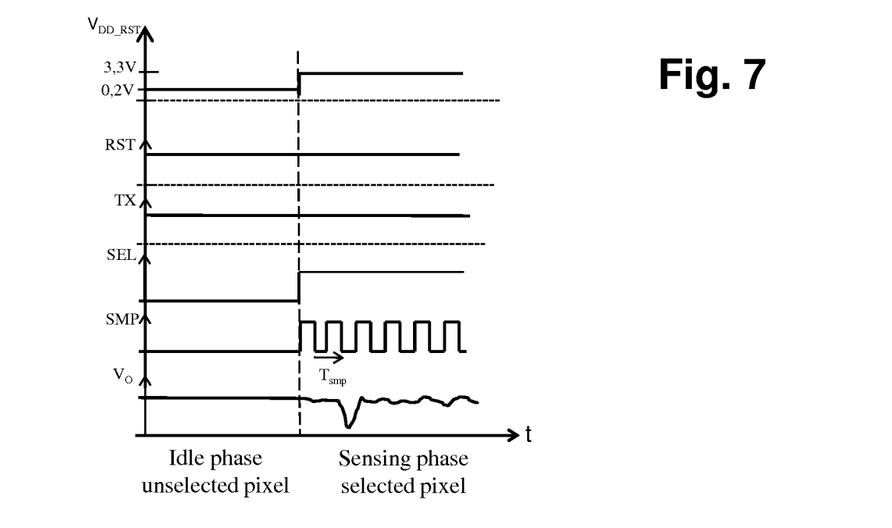
FIG. 7 is a chronogram of the control signals of the pixel structure of FIG. 6, for achieving a sensing phase according to the invention.

An embodiment of a pixel structure in a CMOS imaging sensor for use for direct time of flight measurement according to the invention is illustrated on FIG. 6, and corresponding signals for controlling the pixel operation are illustrated on FIG. 7.

The pixel structure comprises a photodiode, PHD, as a photodetector. It is preferably a pinned photodiode. Note that the invention applies as well to photogates as photodetectors.

It further comprises as in conventional pixel structures of optic sensors, a reset transistor $T_{RST}$ and a transfer transistor $T_{TX}$ connected in series between a voltage supplying node $V_{DD}$-P, and the photodetector. The sense node SN is between the reset transistor and the transfer transistor. It is a capacitive node having a capacitance value C comprised at least of the equivalent parasitic capacitance at the sense node which is intrinsic to the topology and technology of the pixel structure. In a conventional pixel, the capacitance at the sense node is mainly determined by the floating diffusion and a high value is desirable to be able to receive the whole amount of charges having been integrated during the integrating period, before the reading phase.

In the pixel structure embodiment of the invention, the capacitance is preferably reduced at most, which in practice means that it can be reduced to the intrinsic parasitic capacitance of the pixel structure. The capacitance value can then be lower than 5 femtofarads ($10^{-15}$ farads), for example equal to 2 femtofarads. However this is only a preferred condition, which enables to reduce a thermal noise level brought into the capacitance by the operation mode of the reset transistor as a nonlinear resistance as has been already explained. Higher capacitance values could be applied.

The sense node provides an output signal of the pixel, which is a voltage signal $V_{SN}$, which is continuously transmitted to a readout circuitry 300. The readout circuitry 300 mainly comprises a fast analog to digital convertor ADC and filtering means F to reconstruct in digital the waveform of the signal outputted by the sense node with a high signal to noise ratio at least in a frequency band through the filtering means applying at least one of the band pass or high pass filter. The signal is then triggered by triggering means TRG to precisely detect pulse locations in the signal. The ADC is a fast ADC, which means that it operates at a sampling rate SMP that is at least twice 1/τ, where τ is the pulse duration of the signal pulses to be detected. For instance, when τ is equal to 5 ns, a minimum SMP rate is 400 Mhz, which corresponds to a sampling time of 2.5 ns. However, the lower the sampling time the higher the precision in sensing the pulse location and hence that of the measured distance.

As to the filtering means F, they can be implemented in the digital domain, as illustrated in FIG. 6 (after the ADC) which enables to extract further signal information (noise) in a low frequency range. The filtering means can either be implemented In the analog domain, and then the filtering means F is between a sample and hold circuit S&H and the digitizing circuit DCV of the ADC. In this case the low frequency information is lost. This will be explained in more details later.

The pixel operation to make a direct time of flight measurement according to the invention, is controlled through the control signals applied to the reset and transfer transistors of the pixel, and depends on whether the pixel is selected for a DTOF measurement phase, or remains unselected.

When the pixel is unselected, which corresponds to the idle phase of FIG. 7, the operation corresponds to a conventional reset phase of the pixel: a nominal voltage value (0.2 volts in the example) is applied to the supply node $V_{DD}$-P of the pixel through signal $V_{DD\_RST}$, and both the reset transistor and the transfer transistor are switched in the on state: both RST and TX signals are set to the high (logic) voltage, which enables to reset the sense node SN (through the reset transistor) and the photodiode PHD (through the transfer transistor and the reset transistor).

When a pixel is selected (SEL signal set to the high logic level—FIG. 7):
the transfer transistor remains in the same ON state, then operating as a decoupling element between the photodiode node PN (which has a relatively high capacitance) and the sense node SN, which minimizes the capacitance at the sense node;
the reset transistor is operated in a sub-threshold region through lowering its gate voltage, through the RST signal, or increasing its source voltage through the voltage value applied to the supply node $V_{DD}$-P of the pixel. In the example the voltage value applied to the supply node $V_{DD}$-P goes from a low value (0.2 volt for instance) up to a high value (3.3 volts, corresponding to the positive supply voltage of the sensor, for a given technology), while RST is remained to the ON value (3.3 volts). In another example, the low value (0.2 volts in the example) can be continuously applied to the supply node $V_{DD}$-P of the pixels and the operation as a nonlinear resistance is then controlled through lowering the gate voltage level through the RST signal. In practice through one or both of the RST and $V_{DD}$-RST signals, it is possible to implement and control the operation of the reset transistor as a nonlinear resistance in a very wide range.

As a result of this mode of operation of the selected pixel, a spectral density of the signal $V_{SN}$ outputted at the sense node of the pixel is such that the useful signal information is mainly concentrated in a high frequency range, and a noise component is mainly concentrated in a low frequency range, which is exploited through the post filtering means F implemented in the readout circuitry (FIG. 6 or 8) to extract a signal in at least a frequency range concentrating the useful signal with a high SNR, before triggering.

Figure 8:
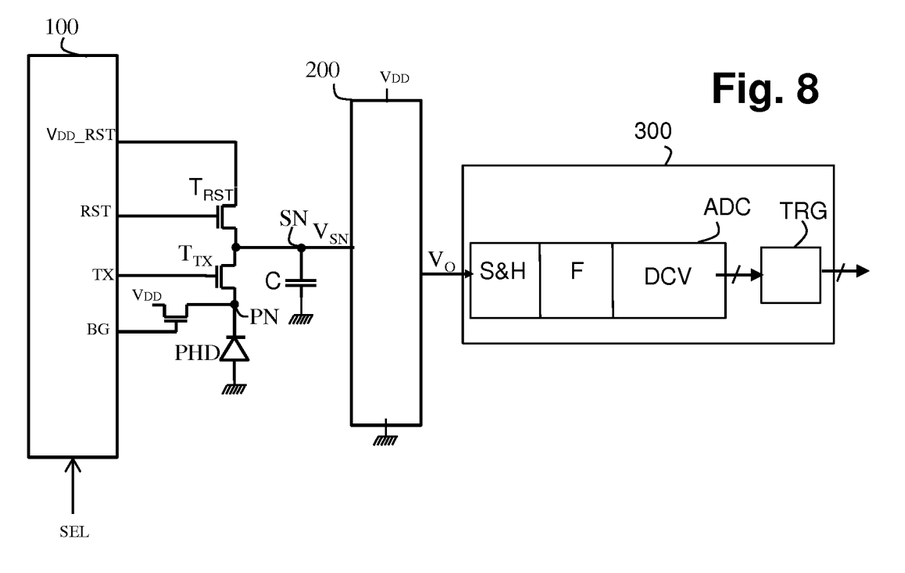
FIG. 8 illustrates a variant of the pixel structure of FIG. 6.

In a variant illustrated on FIG. 8, the pixel structure comprises an anti-blooming transistor $T_{BG}$ connected to the photodetector (node PN), which can be used in the idle state (corresponding to unselected pixels) to extract the charges from the photodiode, and also from the sense node capacitance through the transfer transistor. Then, for instance, the reset transistor can be kept off in the idle state and operated only when the pixel is selected as a nonlinear resistor, in a measurement phase.

There are other possibilities to implement the nonlinear resistance in the pixel, other than through a transistor being operated in a sub-threshold region, so that the invention applies generally to a pixel structure comprising a nonlinear resistance in series with the transfer transistor in a selected pixel. However, the use of the reset transistor makes it easy to apply to any known CMOS pixel technology which are basically comprised of such reset and transfer transistors. That is, only the control circuitry has to be adapted to provide for the measurement phase as explained.

Figure 10:
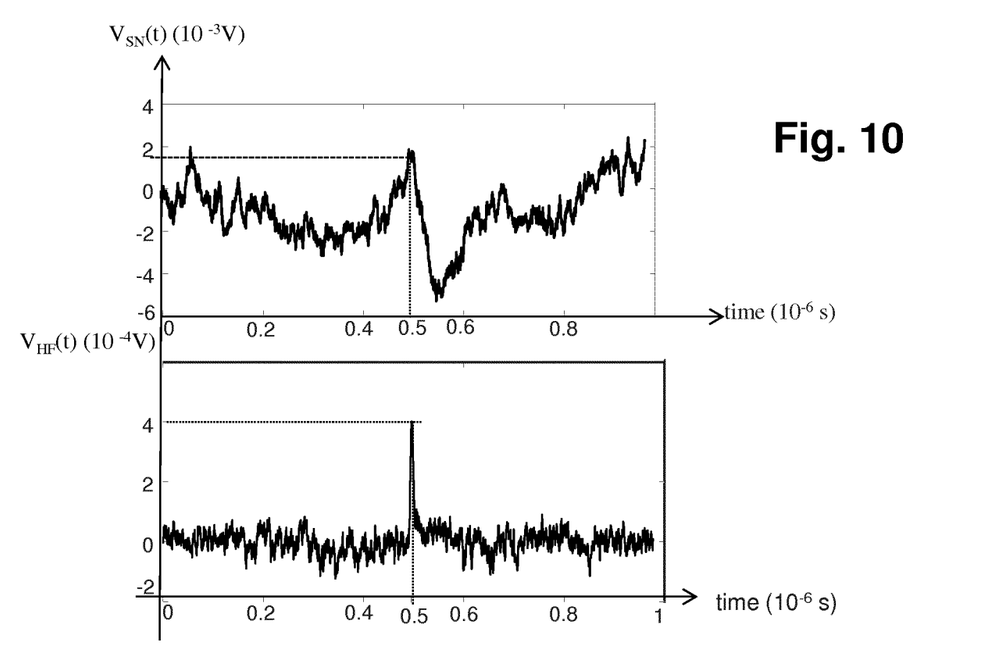
FIG. 10 highlights the SNR improvement through a high pass or band pass filter to the light pulse width of the light source.

FIG. 10 illustrates the effect of the post-filtering of the invention applied at the side of the readout circuitry applying the fast analog to digital sampling. We assume that in the measurement phase beginning at the time 0 and lasting one microsecond in the example, a current pulse as the one illustrated on FIG. 3 was generated by the photodectector (as a response to a backscattered light pulse reaching the pixel) in the middle of the measurement phase, that is at the time 0.5 microsecond in the figure. The signal $V_{SN}$ is very noisy, which makes the pulse signal indicated by the arrow indistinguishable from noise. With a proper filtering according to the invention, we obtain the filtered signal $V_{HF}$: Although the peak of the signal (having the useful information) is reduced, the noise component is greatly attenuated. Then the SNR is significantly improved and the location of the pulse can be efficiently detected through triggering means.

That is, although the signal is low pass filtered by the RC circuit of our CMOS pixel structure, the significant information is not lost and can be significantly recovered through the post filtering means F.

Figure 12:
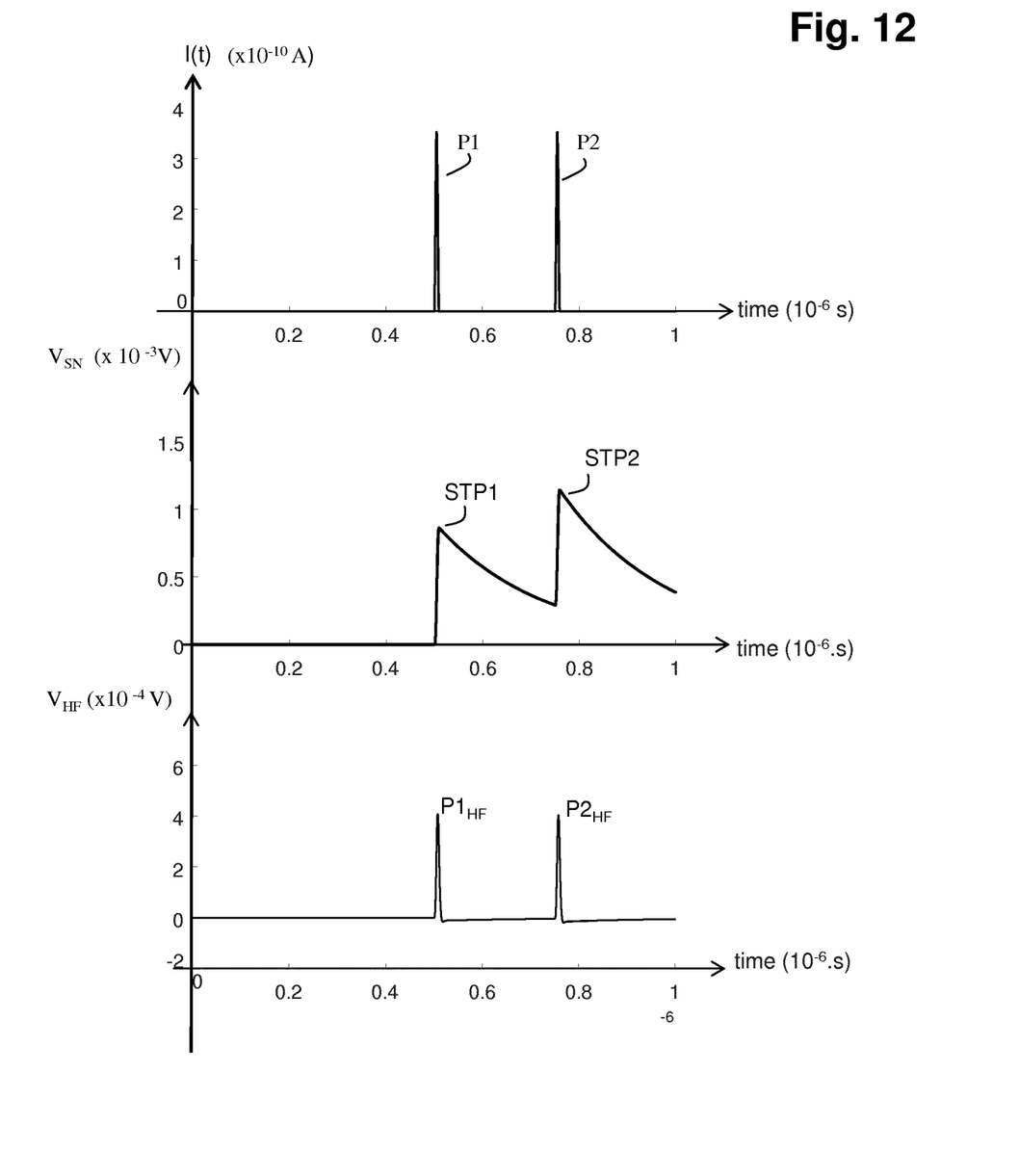
FIG. 12 illustrates the efficiency of a pixel operated according to the invention, when two backscattered light pulses successively reach the pixel closely in time.

This remains true even if several pulses appear, corresponding to the echo from several objects in the scene, located at different distances. This is illustrated on FIG. 12. To simplify the explanation, the noise is omitted. The curve I(t) on top illustrates the photogenerated signal when the photodetector receives successively two light pulses P1 and P2. After voltage conversion by the RC circuit at the pixel level in the selected pixel, the corresponding pulses result in two steps ST1 and ST2 in the signal $V_{SN}(t)$ that are mixed because of the low pass filter function of the RC. However, after our post filtering, both pulses are perfectly recovered in location and amplitude, in the filtered signal $V_{HF}$. In practice we could check that with light pulse duration of 5 ns, it was possible to detect close pulses distant from 50 ns only. Then the propose invention allows for the detection of the position of multiple solid objects appearing as peaks in the signal recovered after a high pass filtering.

Another aspect of the invention regards the signal transmission path between the pixel and the readout circuit.

Indeed, we need to transmit the signal outputted at the sense node that has high frequency information, in a range of 200 MHZ for example as explained. If the output line CL as illustrated on FIG. 6 is used so that several pixels may share a same readout circuitry (one selected pixel read at a time), this results in a transmission path having a high resistance and capacitance between the sense node of the selected pixel and the readout circuit. The output line can be modelized by a combination of capacitances in parallel and resistances in series with a filtering effect that may strongly degrade the signal information. According to an improved embodiment of the invention and as illustrated on FIGS. 6 and 8: a power amplifier circuit 200 is provided between the sense node SN of the pixel and the output line CL that connects the selected pixel to the readout circuit 300. The power amplifier has typically a high input impedance (so as not to weaken the input signal) and a well controlled output impedance to match the impedance of the output line.

Preferably, and as symbolically illustrated in FIG. 6, the power amplifier 200 combines with an implementation of the output line CL by a transmission line, like a micro strip line MST. Then, the output line has a relatively well controlled characteristic impedance, which corresponds to a distributed R (resistance), L (inductor), C (capacitor) model. This combination of the power amplifier with a transmission line improves the fast transmission of the signal to the readout circuit in its whole spectral range (large signal bandwidth transmission).

The power amplifier 200 intrinsically generates noise, in particular shot noise and thermal noise, but it can be kept at a low level at the input of the amplifier, through setting a driving current in the amplifier higher than the one strictly necessary to have the desired amplifier function. Higher is the current, lower is the noise, in particular shot noise and thermal noise. Note that the power amplifier will also generates flicker noise, which is advantageously removed through the band pass or high pass filtering implemented in the readout circuit. The power amplifier 200 may have any suitable structure as known by the man skilled in the art.

In the embodiment of FIG. 6, the amplifier 200 is simply made of a single stage comprising a pair of transistors $T_{FW}$ and $T_{CS}$ in series between a nominal supply voltage (Vim) of the sensor and the ground, forming a so-called "source follower amplifier". The transistor $T_{cs}$ is used as a current source, and is biased with an appropriate gate voltage $V_{bn}$ to produce the current $I_D$ needed to properly fix the biasing condition of the driving transistor $T_{FW}$ in strong inversion and saturation mode, to operate as a source follower element. As explained supra, to lower the noise at the input of the amplifier the current $I_D$ is set higher than the current strictly needed for this. For instance, while a current $I_D$ around $22 \cdot 10^{-6}$ amperes is enough to have the source follower operation, it will be set around $90 \cdot 10^{-6}$ amperes to lower the induced noise at the sense node to an acceptable level.

An advantage of such an embodiment of the amplifier is that it is easily implemented inside the pixel structure, and requires very low area in the pixel (only two transistors). Then the fill factor quantum efficiency (FFQE) of the pixel is not affected. However the impedance and power gain characteristics of such a power amplifier are adequate only when the intrinsic resistance and capacitance of the output line are low, which means in practice that only one or a few pixels (arranged in a same column) are connected to a same readout circuitry 300 through a same output line CL. In case of a high capacitive output line, it is desirable in practice to design or choose a power amplifier 200 having a more complex structure, with several successive amplifier stages, for improving the signal characteristics further. Then further noise reduction and/or power gain are obtained. Also, it relaxes the resolution constraint of the analog to digital convertor through enhancing the SNR.

Figure 9:
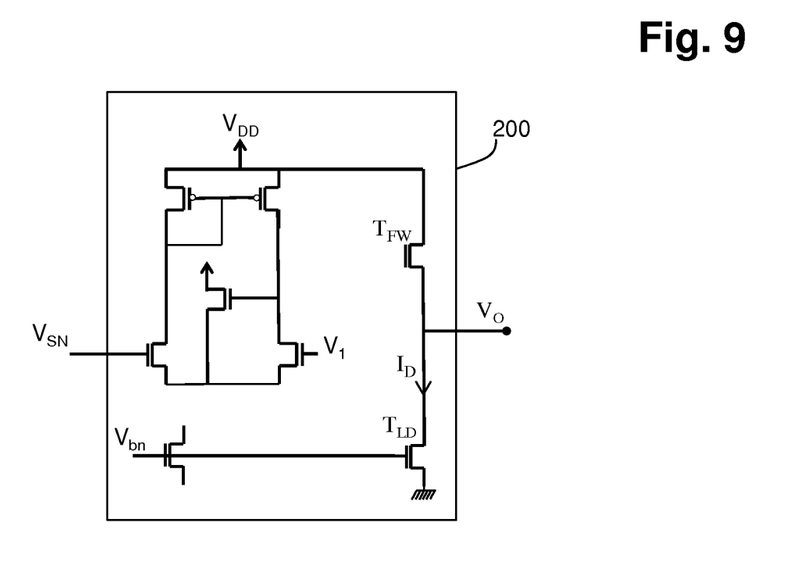
FIG. 9 represents another implementation of the amplifier circuit of FIG. 6.

FIG. 9 illustrates an embodiment of such an improved amplifier for the sake of example only. In this example, the power amplifier 200 includes a first amplifier stage based on transistors of both N and P type (CMOS) with a mirror current arrangement, followed by a source follower stage ($T_{FW}$, $T_{CS}$). The invention is not limited to a particular embodiment of the power amplifier 200 and the man skilled in the art will take into account the different application constraints (surface, impedances involved, . . . ) to design or choose the amplifier structure fitted for a DTOF CMOS sensor according to the invention.

It should be noted that in some cases the power amplifier 200 is not needed. In particular, if all pixels in a sensor must continuously be sensed, which means that they are all selected simultaneously to apply the measurement phase illustrated on FIG. 7, then each pixel must have its own readout circuit 300 comprising at least the fast analog to digital convertor, and possibly the post-filtering means when implemented in analogic at least. In this case the output sense node can directly be connected to its respective readout circuitry which can be done inside the pixel, or implemented on a separate substrate which is stacked with that of the sensor (3D stacking method).

Regarding the filtering means F, as indicated above, they can operate either in the analog (FIG. 8) or the digital domain (FIG. 6). In both cases, the filtering means are designed in account of the high frequency range band which according to the invention contains most of the signal component, while most of the noise component has been filtered out by the RC circuit operation at the level of the pixel.

Figure 13:
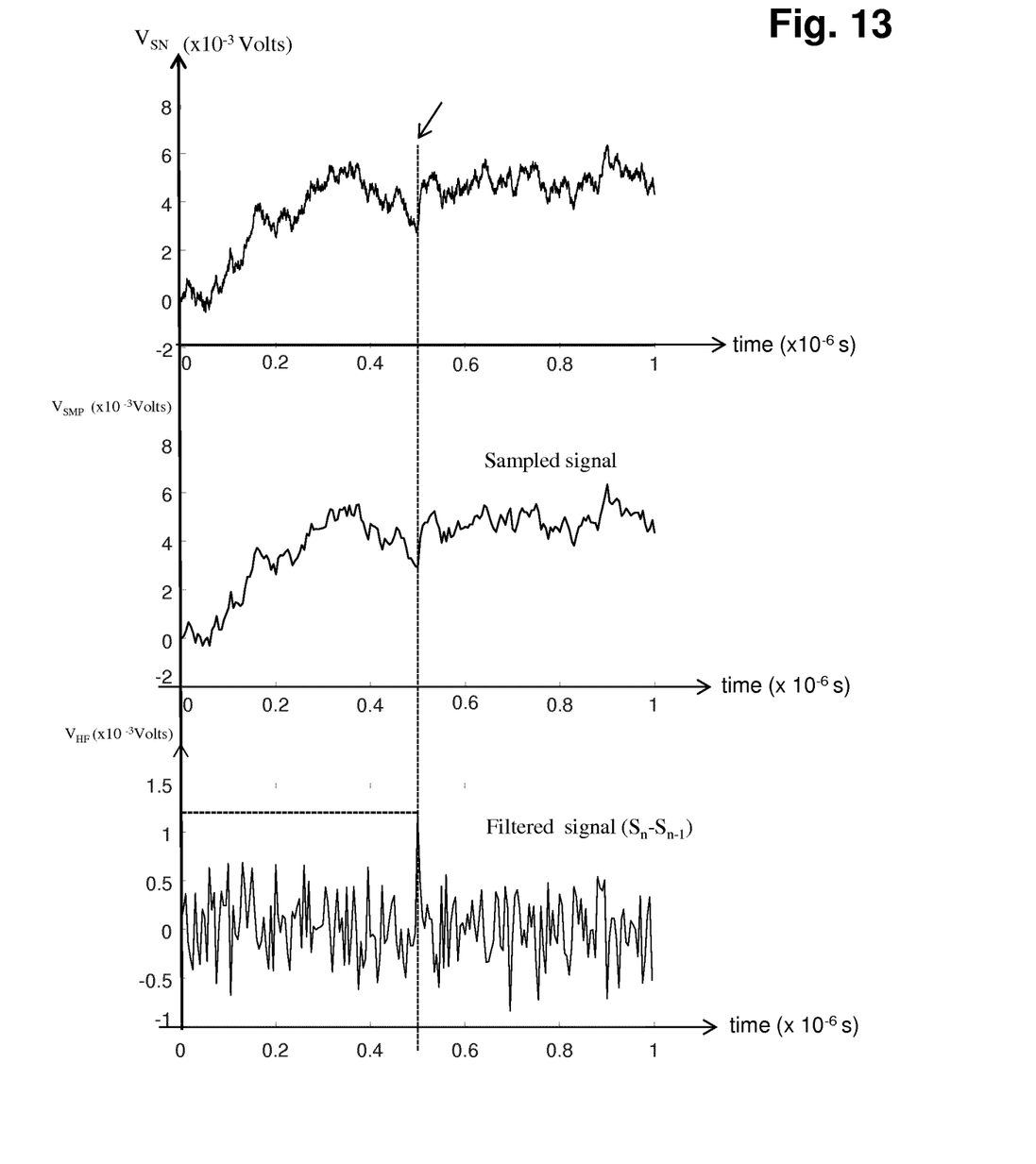
FIG. 13 illustrates the efficiency of a differential digital method for implementing a high pass filtering in the readout circuitry.

In an embodiment, the post-filtering means implements a high pass filter complementary to the low pass filter (RC circuit within the pixel structure). This can be achieved very simply through a differentiating technic making the difference between two successive samples of signal, namely through subtracting from the current sample, the previous sample. This is illustrated on FIG. 13: the first curve on top illustrates the continuous voltage signal $V_{SN}(t)$ outputted at the sense node. The arrow indicates a location in time of a pulse of signal to be detected which is undistinguishable from noise. The second curve in the middle is the reconstructed digitized waveform signal $V_{SMF}(t)$ outputted by the fast analog to digital convertor 300, before filtering. Then the third curve is the differentiated sampled signal obtained through the differentiating method where the filtered sample value at the nth sampling time is equal to the sample value at the nth sampling time less the sample value at the n−1th sampling time. And this result in a signal peak that can be detected from the noise. This subtraction is very easy to implement in digital but in analogic as well.

More complex filters can be implemented to improve the SNR. In particular a band pass filter may be specially fitted to optimize the signal to noise ratio, based on the spectral characteristics of the signal obtained at the sense node. Typically, for light pulses of σ=5 nanoseconds, we have explained that the useful signal at the sense node is mainly concentrated in a frequency range around 200 Mhz (=1/σ). It is possible in a given topology to estimate this frequency range in which the signal is mainly concentrated, for instance 200 Mhz±10 Mhz, and to implement a corresponding band-pass filter.

Figure 11:
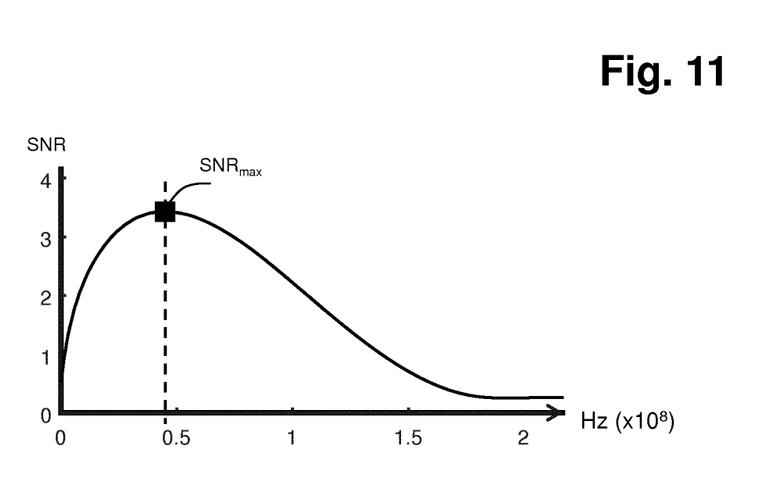
FIG. 11 illustrates a sweeping method to determine an optimum cut-off frequency of the high pass filter.

Also a cutoff frequency of the high pass filter to implement can be evaluated for a given sensor and a given application through sweeping the frequency to find the one that optimizes the SNR. This is illustrated by FIG. 11.

We may then prefer implementing the post-processing filter in the digital domain, that is after the ADC (FIG. 6), which generally means in a processing device, outside the sensor. Then we can implement a filtering process (computation) that combines a high filtering function to recover a pulse position information, and a low filtering function to extract additional signal information including background light signal information. Such background information enables to improve the reliability of the measure.

A practical implementation of the post-processing will depend on the context/application. In particular, if the application if perfectly known, then the post-processing filter can be fixed in analog into the sensor (FIG. 8) and the overall system will be cheaper, with less external components. This is possible because the fundamental filtering operation to apply according to the invention is very simple and easy to implement in hardware as has been explained with reference to FIG. 13 (subtraction between two successive samples). Now if the filter is fixed into the sensor, flexibility of the product is lost. Where improved SNR is desirable, a digital implementation is preferable.

The invention claimed is:

1. A CMOS imaging sensor for detecting time occurrence of a light pulse having a given pulse duration T, comprising:
   pixels, each pixel having a pixel structure comprising at least:
   a photodetector operating as a current source;
   a nonlinear resistor, connected and operated continuously between a voltage supplying node of the pixel and a sense node,
   wherein the sense node is a capacitive sense node having a capacitance, the nonlinear resistor and capacitance of the sense node configured to operate as a low pass filter and to perform current to voltage conversion in a low frequency range and integration in a high frequency range;
   a control circuit for controlling a measurement phase in at least a selected pixel (P) for measuring a time occurrence of a rising edge of a light pulse reaching the photodetector in the pixel, the control circuit being configured to:
   implement continuous current to voltage conversion inside the pixel through the nonlinear resistor, and
   convert, by the nonlinear resistor and capacitance, the signal received from the photodetector to produce a voltage signal at the sense node that has a main signal component comprising at least a rising edge pulse location information in the high frequency range, and a noise component mainly concentrated in the low frequency range spaced apart from said high frequency range, and
   a readout circuitry of a voltage signal from the sense node of a selected pixel, which comprises at least:
   an analog to digital converter applying a high sampling time in respect of the pulse width duration; and
   a filter (F) configured to apply continuously at least one of a band pass or high pass filter, before or after analog to digital conversion, having the effect of increasing the signal to noise ratio in at least a frequency band around the main signal component to recover the rising edge pulse location information.

2. The CMOS imaging sensor of claim 1, wherein the nonlinear resistor is a reset transistor, operated in a sub-threshold region in a selected pixel, which transistor is further used as a switch and turned on to maintain the sense node at a voltage reference in non-selected pixels.

3. The CMOS imaging sensor of claim 2, wherein the control circuit is configured to operate said transistor as a nonlinear resistance in a selected pixel through controlling at least one of a gate signal or a voltage reference applied to the voltage supplying node of the pixel.

4. The CMOS imaging sensor of claim 2, wherein the pixel structure of each pixel further comprises a transfer transistor connected in series between the sense node and the photodetector, wherein the transfer transistor is in the ON state all along the measurement phase, the transfer transistor then operating as a decoupling element between a photodetector node and the sense node and wherein the transfer transistor is also set in the ON mode in the unselected pixels.

5. The CMOS imaging sensor of claim 1, in which the capacitance at the sense node of a pixel is no more than 5 femtofarads.

6. The CMOS imaging sensor of claim 1, in which filter is implemented in the analog to digital convertor, after a sample and hold circuit and before a digitizing circuit.

7. The CMOS imaging sensor of claim 1, in which filter is implemented in digital and operates on the digitized samples provided by the analog to digital convertor.

8. The CMOS imaging sensor of claim 7, wherein digital implementation achieves a high pass filter through computing differences between two successive sampled signals.

9. The CMOS imaging sensor of claim 7, in which the filter is a digital filter which is configured to extract pulse location and amplitude of the signal information in a high frequency range and at least background light noise in a low frequency range.

10. The CMOS imaging sensor of claim 1, further comprising at least a power amplifier between a sense node of a selected pixel and the readout circuit, the power amplifier having a high impedance input and an impedance output matching an impedance of an output line to the readout circuit.

11. The CMOS imaging sensor of claim 10, in which the power amplifier comprises at least a source follower output stage.

12. The CMOS imaging sensor of claim 10, in which the output line is a transmission line.

13. A direct time of flight system comprising a CMOS imaging sensor as claimed in claim 1, as a pulse light receiver, in which a light pulse source is operated to emit only one or a reduced number of light pulses, in a number lower than or equal to 5, per measurement phase.

14. The CMOS imaging sensor of claim 3, wherein the pixel structure of each pixel further comprises a transfer transistor connected in series between the sense node and the photodetector, wherein the transfer transistor is in the ON state all along the measurement phase, the transfer transistor then operating as a decoupling element between a photodetector node and the sense node and wherein the transfer transistor is also set in the ON mode in the unselected pixels.

15. The CMOS imaging sensor of claim 4, in which the capacitance at the sense node of a pixel is no more than 5 femtofarads.

16. The CMOS imaging sensor of claim 5, in which the filter is implemented in the analog to digital convertor, after a sample and hold circuit and before a digitizing circuit.

17. The CMOS imaging sensor of claim 5, in which the filter is implemented in digital and operates on the digitized samples provided by the analog to digital convertor.

18. The CMOS imaging sensor of claim 9, further comprising a power amplifier between a sense node of a selected pixel and the readout circuit, the power amplifier having a high impedance input and an impedance output matching an impedance of an output line to the readout circuit.

19. A method to operate a pixel in a CMOS imaging sensor for measuring a time occurrence of a rising edge of a light pulse having reached the pixel, the pixel having a structure comprising
- a photodetector (PhD) exposed to light and operating as a current source,
- a first reset transistor (TRST) connected between a supply voltage reference source and a capacitive sense node (SN) having a capacitance, wherein the sense node outputs a voltage signal, and wherein the first reset transistor and capacitance of the sense node are configured to operate as a low pass filter and to perform current to voltage conversion in a low frequency range and integration in a high frequency range, wherein the method applies a measurement phase comprising:

continuously operating the first reset transistor as a nonlinear resistance;

converting, by the nonlinear resistance and capacitance, the signal received from the photodetector to produce a voltage signal at the sense node that has a main signal component comprising at least a rising edge pulse location information in the high frequency range, and a noise component mainly concentrated in the low frequency range spaced apart from said high frequency range;

continuously filtering out the voltage signal before or after analog to digital conversion through at least one of a band pass or a high pass filtering, resulting in increasing the signal to noise ratio in the frequency range of the filtering, analog to digital conversion converting prior or after said continuous filtering, at a sampling frequency higher than a frequency value corresponding to the pulse light duration, determining a location of a rising edge of the light pulse in the filtered digital signal through level triggering.

* * * * *